United States Patent
Sinha et al.

(10) Patent No.: US 10,970,455 B1
(45) Date of Patent: Apr. 6, 2021

(54) APPORTIONMENT AWARE HIERARCHICAL TIMING OPTIMIZATION

(71) Applicant: International Business Machines Corporation, Armonk, NY (US)

(72) Inventors: Debjit Sinha, Wappingers Falls, NY (US); Adil Bhanji, Wappingers Falls, NY (US); Nathaniel Douglas Hieter, Clinton Corners, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/777,845

(22) Filed: Jan. 30, 2020

(51) Int. Cl.
*G06F 30/398* (2020.01)
*G06F 119/12* (2020.01)

(52) U.S. Cl.
CPC ........ *G06F 30/398* (2020.01); *G06F 2119/12* (2020.01)

(58) Field of Classification Search
CPC ............................ G06F 30/398; G06F 2119/12
USPC ........................................................ 716/113
See application file for complete search history.

(56) References Cited

U.S. PATENT DOCUMENTS

| | | | |
|---|---|---|---|
| 6,622,291 B1 * | 9/2003 | Ginetti | G06F 30/392 716/108 |
| 7,836,418 B2 | 11/2010 | Binder et al. | |
| 7,853,912 B2 | 12/2010 | Binder et al. | |
| 8,250,509 B2 | 8/2012 | Daede et al. | |
| 8,473,884 B2 | 6/2013 | Daede et al. | |
| 8,689,158 B2 | 4/2014 | Kalafala et al. | |
| 8,701,075 B2 | 4/2014 | Dartu et al. | |
| 8,769,455 B1 * | 7/2014 | Singh | G06F 30/327 716/108 |
| 8,839,166 B1 | 9/2014 | Chakraborty et al. | |
| 8,977,994 B1 * | 3/2015 | Levitsky | G06F 30/327 716/105 |
| 9,177,090 B1 * | 11/2015 | Tzeng | G06F 30/3312 |
| 9,298,872 B2 | 3/2016 | Nam et al. | |
| 9,342,639 B1 | 5/2016 | Casey et al. | |
| 9,542,524 B2 | 1/2017 | Gregerson et al. | |
| 9,875,333 B1 * | 1/2018 | Verma | G06F 30/3312 |
| 10,169,501 B1 | 1/2019 | Kulshreshtha et al. | |
| 10,254,784 B1 | 4/2019 | Morsey et al. | |
| 10,534,883 B1 * | 1/2020 | Bai | G06F 16/2379 |

(Continued)

OTHER PUBLICATIONS

Omedes et al.; "Block Constraints Budgeting in Timing-Driven Hierarchical Flow", DCIS 19th International Conference On, pp. 930-935, Nov. 2004.

(Continued)

*Primary Examiner* — Suresh Memula
(74) *Attorney, Agent, or Firm* — Erik Johnson; Otterstedt, Wallace & Kammer, LLP (57) ABSTRACT

Methods and apparatus for creating an improved VLSI design. In-context timing analysis of a nominal VLSI design is performed and at least one assigned apportionment adjustment is determined for a sub-block of the nominal VLSI design. One or more slack adjustments are derived for at least one port of the sub-block based on the at least one apportionment adjustment and the one or more slack adjustments are applied to the in-context timing analysis to simulate a post optimization version of the sub-block. The in-context timing analysis is repeated using the one or more applied slack adjustments to generate the improved VLSI design.

18 Claims, 8 Drawing Sheets

(56) References Cited

U.S. PATENT DOCUMENTS

| | | | | |
|---|---|---|---|---|
| 2003/0009734 | A1* | 1/2003 | Burks | G06F 30/33 |
| | | | | 716/108 |
| 2004/0078767 | A1* | 4/2004 | Burks | G06F 30/30 |
| | | | | 716/113 |
| 2008/0307374 | A1 | 12/2008 | Gregerson et al. | |
| 2009/0241079 | A1 | 9/2009 | Binder et al. | |
| 2012/0311515 | A1* | 12/2012 | Zolotov | G06F 8/20 |
| | | | | 716/108 |
| 2015/0234971 | A1 | 8/2015 | Nam et al. | |
| 2016/0217245 | A1* | 7/2016 | Gregerson | G06F 30/398 |
| 2018/0068041 | A1 | 3/2018 | Srimal | |
| 2018/0210986 | A1* | 7/2018 | Wu | G06F 30/3323 |

OTHER PUBLICATIONS

Lai et al.; "A Highly Compressed Timing Macro-Modeling Algorithm for Hierarchical and Incremental Timing Analysis", ECE Illinois, pp. 1-23, Jan. 23, 2018.

Kim et al.; "Power-Aware Slack Distribution for Hierarchical VLSI Design", ISCAS IEEE International Symposium On, vol. 4, pp. 4150-4153, May 23-26, 2005.

Lai et al.; "LibAbs: An Efficient and Accurate Timing Macro-Modeling Algorithm for Large Hierarchical Designs", 54th ACM/EDAC/IEEE Conference On, pp. 1-6, Jun. 18-22, 2017.

* cited by examiner

APPORTIONMENT AWARE HIERARCHICAL TIMING OPTIMIZATION

BACKGROUND

The present invention relates to the design of integrated circuits (ICs), and more specifically, to the timing analysis and optimization of such circuits.

In VLSI (very large scale integration) digital design, fabricated devices conventionally include millions of transistors implementing hundreds of storage devices, functional logic circuits, and the like. The designs are often segmented or partitioned into sub-blocks (such as cores, units, macros, sub-hierarchies, and the like) to make the design process more manageable. For example, the design, placement, and routing of the circuits may be conducted at both a high-level and sub-block level, where the high-level considers the complete device including all sub-blocks (known as in-context design) and the sub-block level considers the design of a single sub-block (known as out-of-context design). While a sub-block level design may be used in multiple instances within the device, conventionally, only a single version of the design of the sub-block is produced. Timing considerations for a sub-block conventionally include constraints, such as the specification of the arrival time (AT) for each input signal at the entry of the sub-block and the speciation of a required arrival time (RAT) for generating each output signal of the sub-block. Note that the arrival time may vary between different input signals and the required arrival time may vary between different output signals. In addition, if a sub-block design is used multiple times within a high-level design, the arrival time constraint provided for the sub-block design is, for example, the worst case (latest) arrival time of the corresponding input port over all instances of the sub-block. Similarly, the required arrival time constraint provided for the sub-block design is the worst case (earliest) arrival time of the corresponding output port over all instances of the sub-block. A similar set of constraints may be provided for fastest or shortest path analysis where the earliest arrival time is considered. Conventionally, the high-level (in-context) design is completed after the sub-blocks are designed. There are different paradigms used in industry—in-context design completed after sub-blocks is one such paradigm. This is "sequential" design flow. Another technique involves iteratively performing in-context timing regularly with delivered, partially complete sub-blocks; providing feedback to sub-block designers and enabling more concurrent design environment. The latter is preferred for faster chip time-to-market requirements.

SUMMARY

Principles of the invention provide techniques for apportionment aware hierarchical timing optimization. In one aspect, an exemplary method includes the operations of performing in-context timing analysis of a nominal VLSI design; determining at least one assigned apportionment adjustment for a sub-block of the nominal VLSI design; deriving one or more slack adjustments for at least one port of the sub-block based on the at least one apportionment adjustment; applying the one or more slack adjustments to the in-context timing analysis to simulate a post optimization version of the sub-block; and repeating the in-context timing analysis using the one or more applied slack adjustments to generate the improved VLSI design.

In one aspect, a non-transitory computer readable medium comprises computer executable instructions which when executed by a computer cause the computer to perform the method of: performing in-context timing analysis of a nominal VLSI design; determining at least one assigned apportionment adjustment for a sub-block of the nominal VLSI design; deriving one or more slack adjustments for at least one port of the sub-block based on the at least one apportionment adjustment; applying the one or more slack adjustments to the in-context timing analysis to simulate a post optimization version of the sub-block; and repeating the in-context timing analysis using the one or more applied slack adjustments to generate the improved VLSI design.

In one aspect, an apparatus comprises a memory; and at least one processor, coupled to said memory, and operative to perform operations comprising: performing in-context timing analysis of a nominal VLSI design; determining at least one assigned apportionment adjustment for a sub-block of the nominal VLSI design; deriving one or more slack adjustments for at least one port of the sub-block based on the at least one apportionment adjustment; applying the one or more slack adjustments to the in-context timing analysis to simulate a post optimization version of the sub-block; and repeating the in-context timing analysis using the one or more applied slack adjustments to generate the improved VLSI design.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

proper apportionment of slack deficits between a high-level design and the corresponding sub-block(s);

reduced design cycle time;

reduced number of design iterations;

improved designer efficiency;

improved performance of a computer carrying out Electronic Design Automation (EDA) because the analysis will converge faster and less CPU time will be used;

reduction in the overall compute resources needed to complete the design;

optimized designs that operate at intended design specifications, with improved power use;

improved performance of integrated circuits designed using aspects of the invention, as compared to those not designed using aspects of the invention, at least under conditions where there is the same CPU time budget for the design process.

These and other features and advantages of the present invention will become apparent from the following detailed description of illustrative embodiments thereof, which is to be read in connection with the accompanying drawings.

DETAILED DESCRIPTION

Figure 1A:
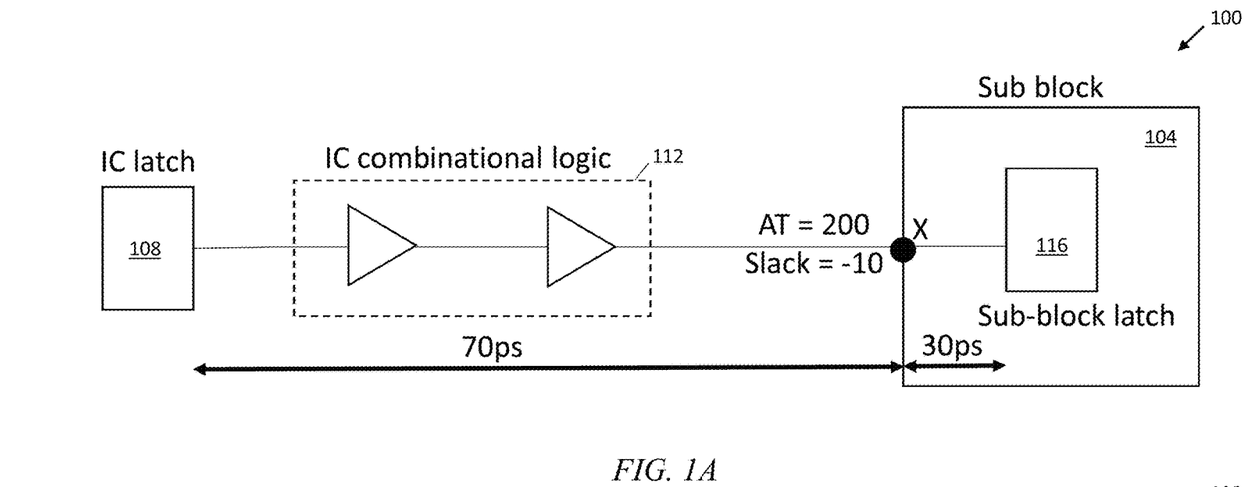
FIGS. 1A and 1B show example time constraints for a sub-block, in accordance with an example embodiment.
Figure 1B:
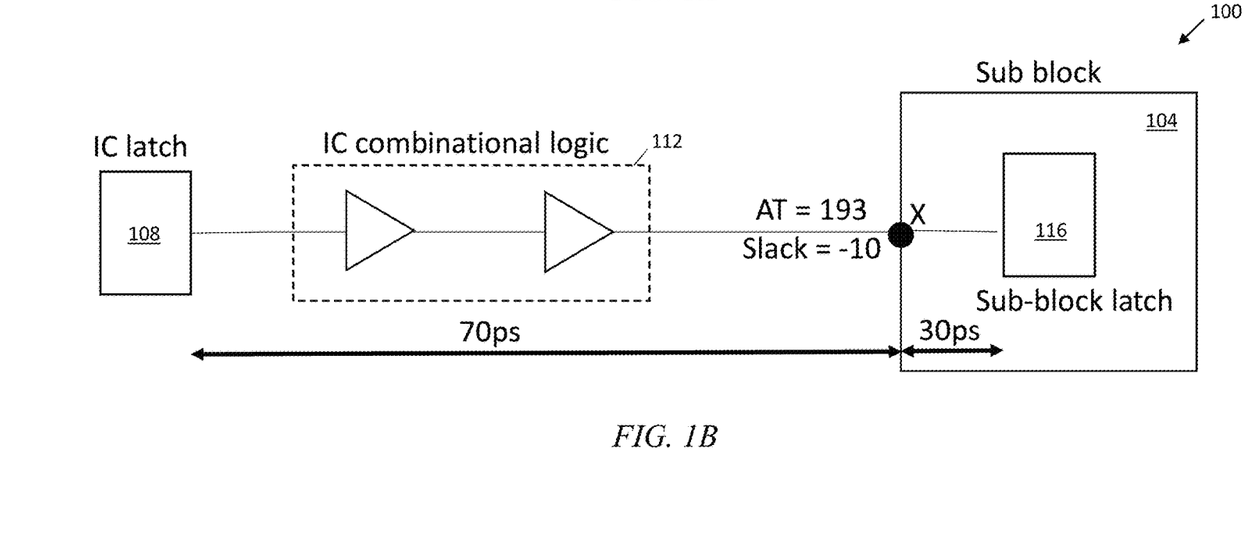

Principles of the invention provide techniques for performing hierarchical timing optimization for signals crossing into or out of sub-blocks of a VLSI design. FIGS. 1A and 1B show example time constraints for a sub-block 104, in accordance with an example embodiment. Input ports and output ports of sub-block 104, such as input port X, are used to interface the sub-block 104 to the high-level design 100. The constraints (also known as contracts or assertions) are generated for each input port and each output port of the sub-block 104. Example constraints include arrival times (ATs) for input ports, slew rates/transition times for input ports, required arrival times (RATs) for output ports, and the like. The constraints are used during the out-of-context timing optimization of the sub-block 104.

As illustrated in FIG. 1A, an IC latch 108 drives a signal through IC combinational logic 112 to the sub-block 104. The arrival time (AT) of the signal at input port X, the input to the sub-block 104, is specified as occurring 200 picoseconds (ps) after the data is clocked into the IC latch 108. This is due to the 130 ps delay in generating the output of the IC latch 108 and the 70 ps propagation delay through the IC combinational logic 112 (including the associated wire delays from the output of the IC latch 108 to the input port X). Taking into account the 30 ps propagation delay between input port X and sub-block latch 116 of the sub-block 104, the signal is determined to arrive 10 ps too late to meet the timing requirements of the device or, in other words, the slack is −10 ps.

Conventionally, the negative slack situation (the slack deficit) would be addressed using one of a number of techniques. For example, both the in-context (high-level) and out-of-context (sub-block level) optimizations could be performed concurrently with each optimization attempting to remediate the 10 ps deficit of the signal. In this case, the design will be "over-fixed" if both optimizations cumulatively remove more than a total of 10 ps of the propagation delay of the circuit. Since an over-fix is often the result of an increase in the buffer count and/or an increase in the buffer strength (that is greater than necessary), the corresponding increase in power consumption may prove wasteful. This also leads to unnecessary iterations of the in-context and out-of-context optimizations. In general, concurrent timing optimization at both the in-context and out-of-context levels can be wasteful and inefficient as both optimizations may attempt to solve the same problem.

In a second scenario, the in-context and out-of-context optimizations are performed sequentially, or substantially sequentially, using apportioned slack remediation. Modified constraints are generated for the sub-block 104 to indicate the desired amount of optimization that is to be attained for the sub-block 104. The desired slack optimization for the sub-block 104 is based, for example, on the fraction of path delay of a signal in the sub-block 104 relative to the total path delay of the signal. For example, as illustrated in FIG. 1A, the 30 ps of path delay in the sub-block 104 relative to the total path delay of 100 ps is 30%. Thus, the out-of-context optimization is only asked to remediate 30% of the 10 ps negative slack, or 3 ps of the slack deficit. The constraint assigned to input port X is therefore given relief of 7 ps (10 ps minus the 3 ps assigned to the sub-block 104). The 200 ps arrival time is therefore modified to 193 ps, as illustrated in FIG. 1B, to give the sub-block 104 more time to operate (and less deficit to remediate). Thus, the sub-block 104 will remediate 30% (or 3 ps) of the slack deficit and the high level design 100 will continue to remediate the original 10 ps of slack deficit. Note that FIG. 1B shows the slack unchanged at −10 ps as the in-context run still sees the slack as −10 ps and will attempt to correct that amount of slack.

The process, for the second scenario above, is therefore as follows. An in-context run creates the apportioned assertions for each sub-block 104. The in-context runs continue, attempting to fix the full 10 ps slack deficit. At some point in time, concurrently with and/or subsequent to the in-context runs, out-of-context runs are performed, attempting to fix the apportioned 3 ps slack deficit. An updated sub-block 104 (or abstract) are provided to and utilized by a subsequent in-context run. Thus, both the IC (in-context; the skilled artisan will appreciate from the surrounding text whether "IC" used herein refers to "integrated circuit" or "in-context" (as opposed to "out-of-context")) and out-of-context (OOC) optimizations have worked on remediating the same 3 ps slack deficit and, if successful, have eliminated 13 ps of propagation delay (3 ps by the sub-block 104 and 10 ps by the circuitry of the high-level design).

In one example embodiment, the in-context optimization process is modified to simulate (before the optimization of the sub-block 104 is complete in regard to the 3 ps deficit) the timing of the sub-block 104 post optimization. This avoids performing IC optimization with the unoptimized sub-block 104 and avoids delaying the IC optimization until the OOC optimization is complete. In one example embodiment, the determined apportionments are used to modify the timing at ports (both input and output) of the sub-block 104. The arrival times at the input ports and the output ports of the sub-block 104 are adjusted by the desired credit, such as 3 ps. In addition, the in-context optimization should adjust for the modified timing for all instances of the sub-block 104. For example, as illustrated in FIG. 1B, the OOC optimization attempts to remediate 3 ps of the 10 ps slack deficit and the IC optimization attempts to remediate 7 ps of the 10 ps slack deficit. Once the modified constraints are established, both the IC and the OOC optimizations are performed using the adjusted constraints.

Figures 2A, 2B:
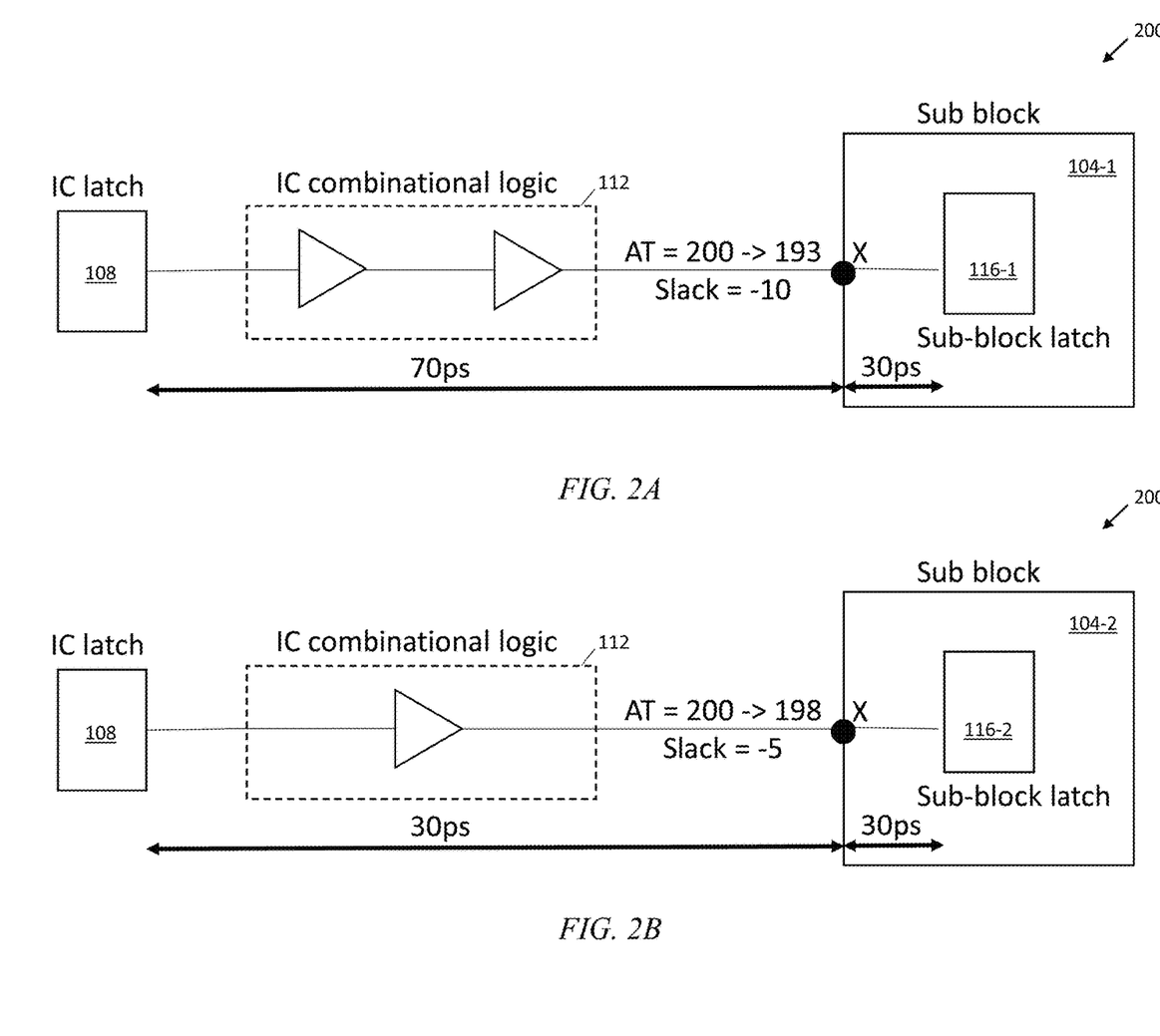
FIGS. 2A and 2B illustrate a portion of a VLSI design that uses two instances of the same design of the sub-block, in accordance with an example embodiment.

In one example embodiment, a timing constraint can be applied in the IC run to modify the RAT by the amount of desired credit assigned to the sub-block 104. Since sub-block 104 will remediate 3 ps of the 10 ps slack deficit, the RAT for the IC optimization is, in one or more embodiments, modified at IC point Y from 190 to 193, so that the IC slack is 200−193=−7 reflecting the amount to be remediated in the IC run. The RAT must be adjusted as opposed to being fixed to allow for the cases where there are multiple instances of sub-block 104, as shown in FIGS. 2A and 2B, and the amounts of IC remediation differ due to the path distances outside of the sub-blocks 104. This is referred to as "adjust_rat" herein.

In one example embodiment, for the purposes of IC optimization, a new identifying tag is introduced that forces an IC slack of, for example, −7 at a particular location in the path. The optimization flow would be modified to use the RAT for this tag in the slack calculation, hence not modifying the actual timing in the design until the optimized version of block 104 is delivered. This is referred to as the "create_phase_with_desired_credit" method herein.

In another embodiment, the arrival time seen in the IC at the output port of an IC latch can be modified to reflect the intended slack remediation assigned to a particular sub-block 104. In this example, the AT can be adjusted back by 3, giving the IC path the 3 ps relief, corresponding to the expected improvement in block 104. This is referred to as the "adjust_arrival_time_with_desired_credit" method herein.

FIGS. 2A and 2B illustrate a portion of a VLSI design 200 that uses two instances of the same design of the sub-block 104-1, 104-2, with corresponding latches 116-1 and 116-2, in accordance with an example embodiment. Recall that a single design of a sub-block 104 may be used in multiple instances of the VLSI design 200. As illustrated in FIG. 2A, the slack is −10 ps for the first instance. Using the apportionment technique described above, the apportionment to the sub-block 104-1 is 30% and the relief is 7 ps (of the slack deficit of 10 ps). As illustrated in FIG. 2B, the slack is −5 ps for the sub-block 104-2. Using the apportionment technique described above, the apportionment to the sub-block 104 is 50% of the total path delay and the relief is 2.5 ps (of the slack deficit of 5 ps). A decision on the amount of relief to be assigned to the sub-blocks 104-1, 104-2 should be made. Since the same design corresponds to both instances of the sub-blocks 104-1, 104-2, a single amount of relief must be assigned. In one example embodiment, the relief is based on the first instance of the sub-block 104; other embodiments could use other techniques; e.g., the relief could be based on the instance of the sub-block 104 having the least amount of relief; the instance of the sub-block 104 having the greatest amount of relief; the instance of the sub-block 104 having the greatest amount of required sub-block remediation; the instance of the sub-block 104 having the least amount of required sub-block remediation; or using other techniques known in the art. In a non-limiting example, the assigned relief can be the average of the relief across all instances.

For example, using the greatest amount of relief assigned, 7 ps of relief would be selected, meaning the arrival time is adjusted from 200 ps to 193 ps (resulting in a slack deficit of 3 ps from the perspective of the sub-block 104-1) and the propagation delay for the sub-block 104-1 is to be improved by 3 ps. Based on the 3 ps improvement to the design of the sub-block 104, the new design of the sub-block 104 results in remediation of the slack deficit of 5 ps for the sub-block 104-2. In particular, since the slack deficit was 5 ps and the sub-block design has been improved by 3 ps, only 2 ps of slack deficit remains. Thus, only 2 ps of relief is needed by sub-block 104-2 and the arrival time for the second instance of sub-block 104 will be adjusted by 2 ps, or adjusted from 200 ps to 198 ps.

Figure 3:
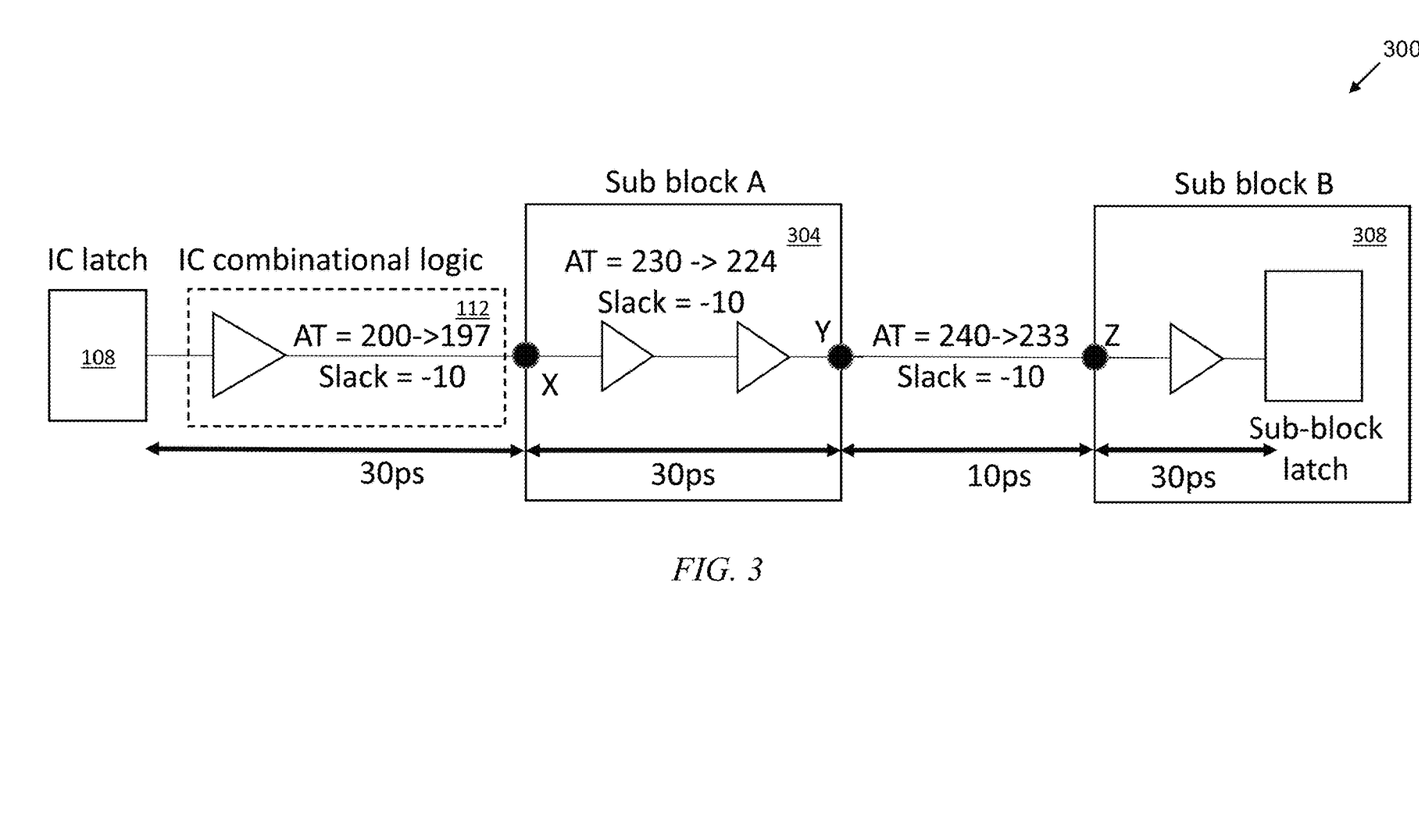
FIG. 3 illustrates a portion of a VLSI design that uses a single instance of two different designs for sub-blocks, in accordance with an example embodiment.

FIG. 3 illustrates a portion of a VLSI design 300 that uses a single instance of two different designs for sub-blocks 304, 308, in accordance with an example embodiment. As illustrated in FIG. 3, the slack is −10 ps for the entire signal path. Using the apportionment technique described above, the apportionment to the sub-block 304 is 30% and the apportionment to the sub-block 308 is 30%. The relief is therefore 7 ps for each of the sub-blocks 304, 308 (70% of the slack deficit of 10 ps). The arrival time for sub-block 308 is therefore adjusted from 240 ps to 233 ps. The 7 ps of relief for the sub-block 304 may be divided substantially equally between the input port and the output port (other divisions of the relief between the input port and the output port, based on other design considerations known in the art, are also acceptable). For example, the input port may be adjusted by 3 ps with the arrival time being adjusted to 197 ps, and the output port may be adjusted by 4 ps with the required arrival time being adjusted to 224 ps. Regardless of the division of the relief time, the effect on the sub-block 304 will be the equivalent of an extra 7 ps being available for propagation delay through the sub-block 304.

If there are latches or other storage components within a sub-block (such as in sub-block 304), the "entire signal path" would span blocks 108, 112 and the portion from the input of block 304 to the latch within block 304. The apportionment percentages would be different than the example of 30%, but would be determined based on the delays through 108, 112 and the portion within block 304.

The division of the 7 ps cited above will, however, have an effect on the high-level design 300. For example, it will determine and change the amount of time available for propagation delay into the sub-block 304 and the amount of time available for propagation delay between the sub-block 304 and the sub-block 308. As noted above, the relief may be divided substantially equally between the input port and the output port (other divisions of the relief between the input port and the output port, based on other design considerations known in the art, are also acceptable).

Figure 4:
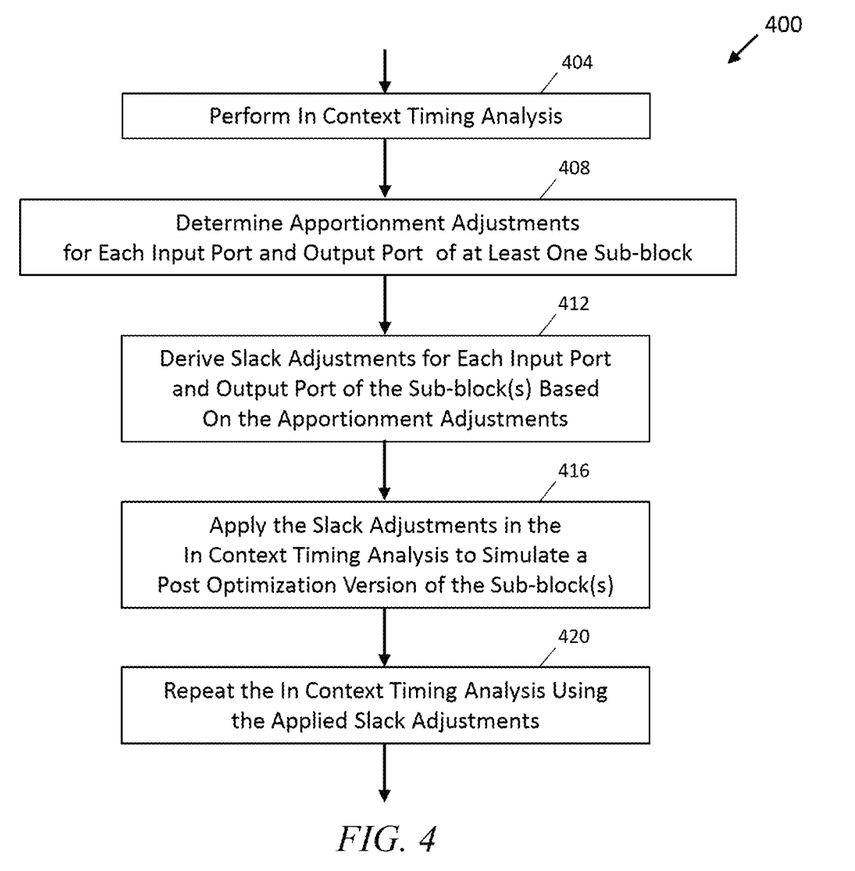
FIG. 4 is a flowchart for an example method for creating an improved VLSI design, in accordance with an example embodiment.

FIG. 4 is a flowchart 400 for an example method for creating an improved VLSI design 200, 300, in accordance with an example embodiment. In one example embodiment, in-context timing analysis of the improved VLSI design is performed (operation 404). Apportionment adjustments are determined for each input port and each output port of the sub-block(s) 104 (operation 408). A slack adjustment is derived for each input port and each output port of the sub-block(s) 104 based on the apportionment adjustments (operation 412). The slack adjustments are applied to the in-context timing analysis to simulate a post optimization version of the sub-block(s) 104 (operation 416). The in-context timing analysis is repeated using the applied slack adjustments (operation 420).

In one example embodiment, any sub-block 104 labeled as frozen is skipped during operations 408-416, that is, the slack is not apportioned and arrival times are not adjusted. In one example embodiment, a user may over-ride the apportionment and/or slack adjustment of one or more input ports and/or output ports, and/or of an entire sub-block 104.

In other example embodiments, statistical timing analysis is utilized. During statistical timing analysis, timing values like arrival time, slews, slacks, and slack adjustments are represented as probabilistic random variables with known probability density functions (PDFs). Variations in the device operating-voltage, operating-temperature, manufacturing process, and the like cause uncertainty in timing values of the manufactured chip design. To model the uncertainty during timing analysis and optimization, timing values are represented as statistical values. The skilled artisan would understand how to extend the disclosed methods to utilize probabilistic random variables where each timing value like arrival time, slack, apportionment, relief, and slack adjustment are represented as a statistical variable, as mathematical operations on statistical variables are performed conceptually the same way as is done for non-statistical analysis. In this case, the final adjustments applied are also statistical values which provide statistical relief during statistical timing optimization.

Given the discussion thus far, it will be appreciated that, in one aspect, an exemplary method, implemented at least in part on a computer, includes performing in-context timing analysis of a nominal VLSI design 100 (operation 404); determining at least one assigned apportionment adjustment for a sub-block 104 of the nominal VLSI design 100 (operation 408); deriving one or more slack adjustments for at least one port of the sub-block 104 based on the at least one apportionment adjustment (operation 412); applying the one or more slack adjustments to the in-context timing analysis to simulate a post optimization version of the sub-block 104 (operation 416); and repeating the in-context timing analysis using the one or more applied slack adjustments to generate the improved VLSI design 200, 300 (operation 420).

In one aspect, a non-transitory computer readable medium comprises computer executable instructions which when executed by a computer cause the computer to perform the method of: performing in-context timing analysis of a nominal VLSI design 100 (operation 404); determining at least one assigned apportionment adjustment for a sub-block 104 of the nominal VLSI design 100 (operation 408); deriving one or more slack adjustments for at least one port of the sub-block 104 based on the at least one apportionment adjustment (operation 412); applying the one or more slack adjustments to the in-context timing analysis to simulate a post optimization version of the sub-block 104 (operation 416); and repeating the in-context timing analysis using the one or more applied slack adjustments to generate the improved VLSI design 200, 300 (operation 420).

In one aspect, an apparatus comprises a memory; and at least one processor, coupled to said memory, and operative to perform operations comprising: performing in-context timing analysis of a nominal VLSI design 100 (operation 404); determining at least one assigned apportionment adjustment for a sub-block 104 of the nominal VLSI design 100 (operation 408); deriving one or more slack adjustments for at least one port of the sub-block 104 based on the at least one apportionment adjustment (operation 412); applying the one or more slack adjustments to the in-context timing analysis to simulate a post optimization version of the sub-block 104 (operation 416); and repeating the in-context timing analysis using the one or more applied slack adjustments to generate the improved VLSI design 200, 300 (operation 420).

In one example embodiment, the at least one apportionment adjustment is determined by dividing a portion of a path delay internal to the sub-block 104 by a sum of the path delay internal to the sub-block 104 and a path delay external to the sub-block 104. In one example embodiment, an apportionment adjustment is determined for each instance of a sub-block design and an apportionment adjustment having a greatest amount of required remediation within the sub-block 104 is used to determine the assigned apportionment adjustment for the sub-block 104. In one example embodiment, each slack deficit is adjusted by reducing the slack deficit by an amount proportional to the assigned apportionment adjustment for the sub-block 104. In one example embodiment, an arrival time is determined by reducing a raw arrival time by a difference between an original slack deficit and the assigned delay reduction.

In one example embodiment, an application of at least one slack adjustment in the in-context timing analysis is removed in response to a completion of an optimization of the corresponding sub-block 104. In one example embodiment, arrival times, required arrival times, path delays, slacks and adjustments are represented as statistical values, the calculations, adjustments that apply to discrete/deterministic timing can be made with statistical times in a statistical timing analysis environment. In one example embodiment, one or more sub-blocks 104 labeled frozen are skipped during the applying operation. In one example embodiment, the derivation of the slack adjustment is based on a user-revised version of the apportionment adjustment. In one example embodiment, an arrival time at an output port of a corresponding latch 108 is modified to reflect an intended slack remediation assigned to a specified sub-block 104.

In one or more embodiments, a further step includes fabricating a physical integrated circuit in accordance with the VLSI design. One non-limiting specific example of accomplishing this is described elsewhere herein in connection with FIGS. 6-8. For example, a design structure, based on the VLSI design, is provided to fabrication equipment to facilitate fabrication of a physical integrated circuit in accordance with the design structure.

Figure 6:
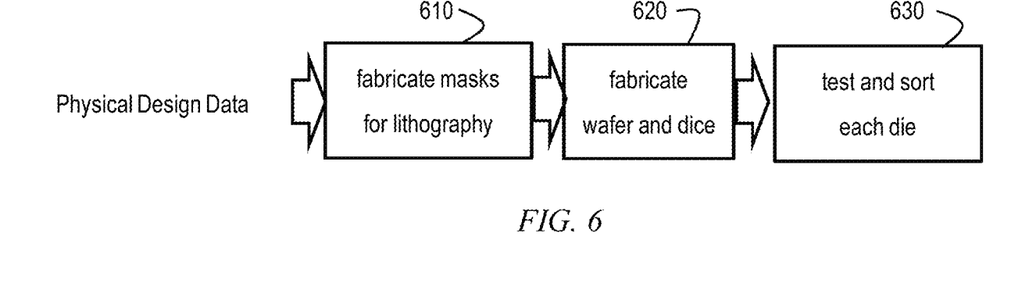
FIG. 6 is a flow diagram of a design process used in semiconductor design, manufacture, and/or test.

FIG. 6 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 6. Generally, a wafer with multiple copies of the final design is fabricated and cut (i.e., diced) such that each die is one copy of the integrated circuit. At block 610, the processes include fabricating masks for lithography based on the finalized physical layout. At block 620, fabricating the wafer includes using the masks to perform photolithography and etching. Once the wafer is diced, testing and sorting each die is performed at 630 to filter out any faulty die.

Figure 7:
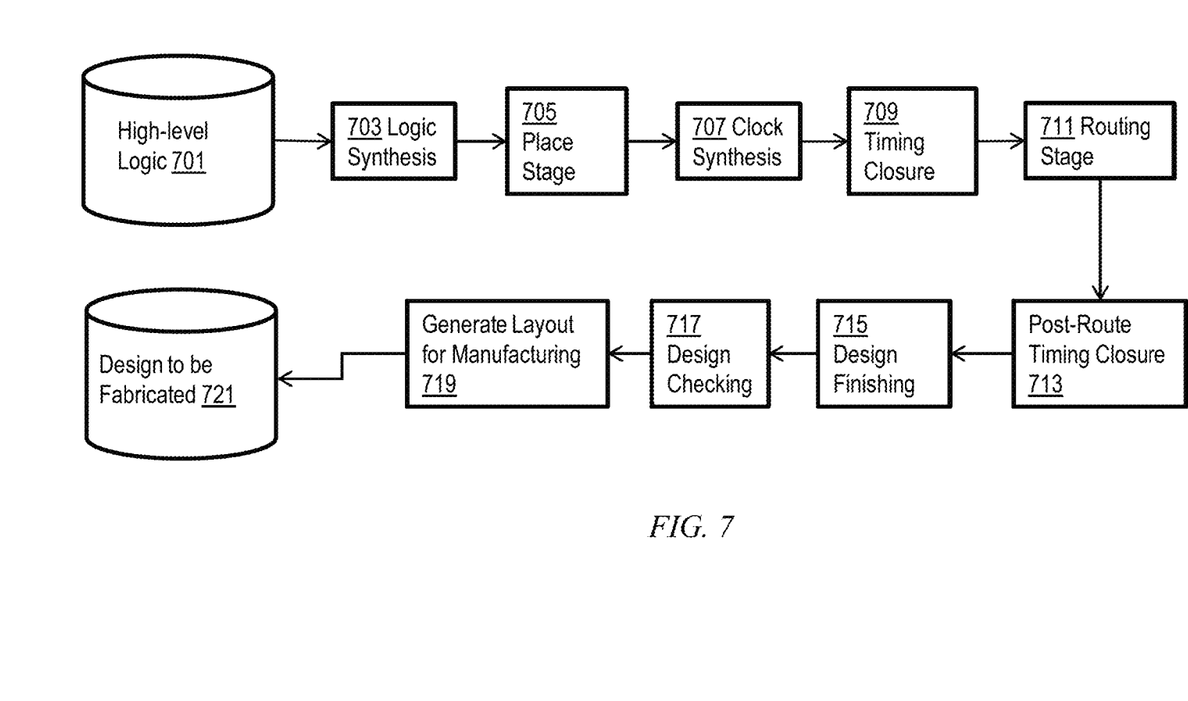
FIG. 7 shows further aspects of IC fabrication from physical design data.

FIG. 7 depicts an example high-level Electronic Design Automation (EDA) tool flow, which is responsible for creating an optimized microprocessor (or other IC) design to be manufactured. A designer could start with a high-level logic description 701 of the circuit (e.g. VHDL or Verilog). The logic synthesis tool 703 compiles the logic, and optimizes it without any sense of its physical representation, and with estimated timing information. The placement tool 705 takes the logical description and places each component, looking to minimize congestion in each area of the design. The clock synthesis tool 707 optimizes the clock tree network by cloning/balancing/buffering the latches or registers. The timing closure step 709 performs a number of optimizations on the design, including buffering, wire tuning, and circuit repowering; its goal is to produce a design which is routable, without timing violations, and without excess power consumption. The routing stage 711 takes the placed/optimized design, and determines how to create wires to connect all of the components, without causing manufacturing violations. Post-route timing closure 713 performs another set of optimizations to resolve any violations that are remaining after the routing. Design finishing 715 then adds extra metal shapes to the netlist, to conform with manufacturing requirements. The checking steps 717 analyze whether the design is violating any requirements such as manufacturing, timing, power, electromigration or noise. When the design is clean, the final step 719 is to generate a layout for the design, representing all the shapes to be fabricated in the design to be fabricated 721.

Exemplary System

One or more embodiments of the invention, or elements thereof, can be implemented in the form of an apparatus including a memory and at least one processor that is coupled to the memory and operative to perform exemplary method steps.

Figure 5:
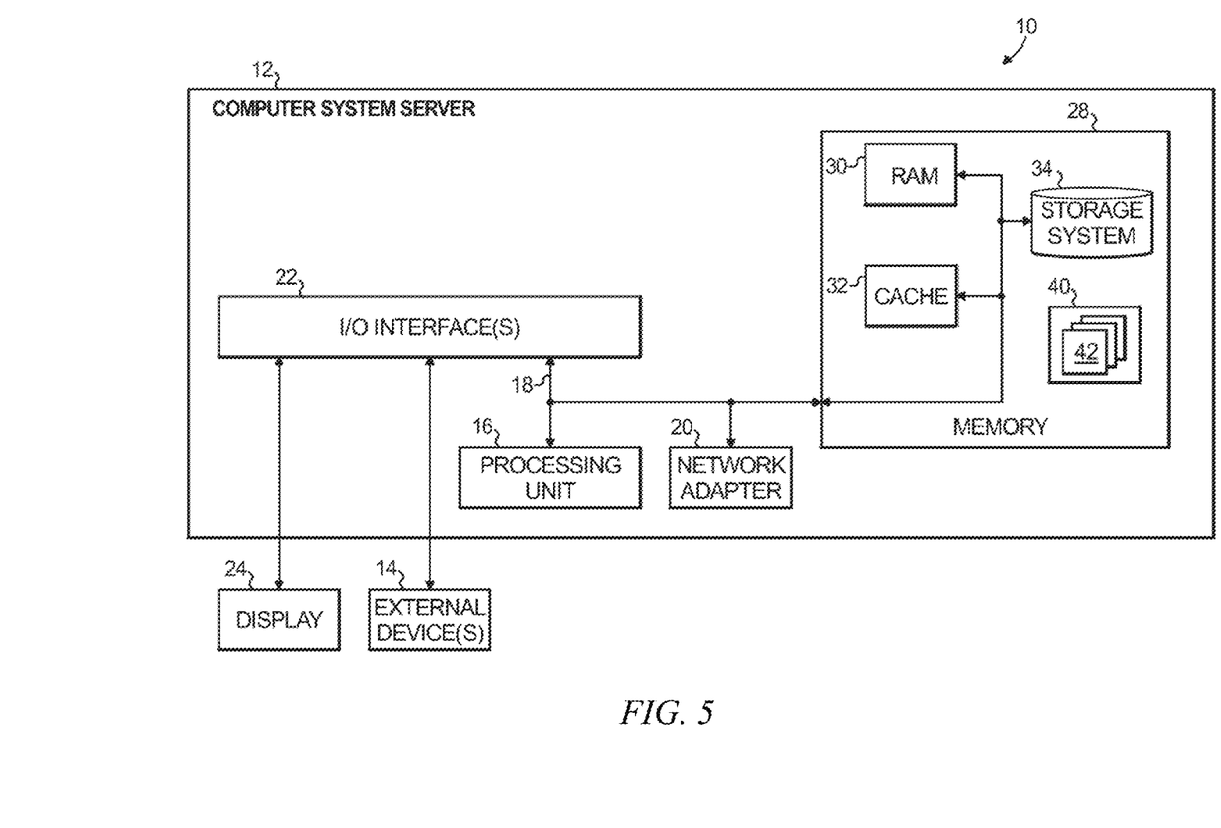
FIG. 5 depicts a computer system that may be useful in implementing one or more aspects and/or elements of the invention.

FIG. 5 depicts a computer system that may be useful in implementing one or more aspects and/or elements of the invention. One or more embodiments include a computer including a memory 28; and at least one processing unit 16, coupled to the memory, and operative to carry out or otherwise facilitate any one, some, or all of the method steps described herein.

In one or more embodiments, the performance (speed) of this computer is improved by optimization techniques disclosed herein, resulting in faster convergence and less CPU time, as compared to prior art techniques. Furthermore, referring to FIGS. 6-8, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper remediation of slack deficits) compared to circuits designed using prior art techniques, at least under conditions where there is the same CPU time budget for the design process. To achieve similar improvements with prior-art techniques, even if possible, would require expenditure of more CPU time as compared to embodiments of the invention.

As used herein, including the claims, a "server" includes a physical data processing system (for example, the computer system as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules/routines and/or sub-modules/subroutines of the system, as described above, executing on one or more hardware processors 602. Further, a computer program product as described below can include code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

Figure 8:
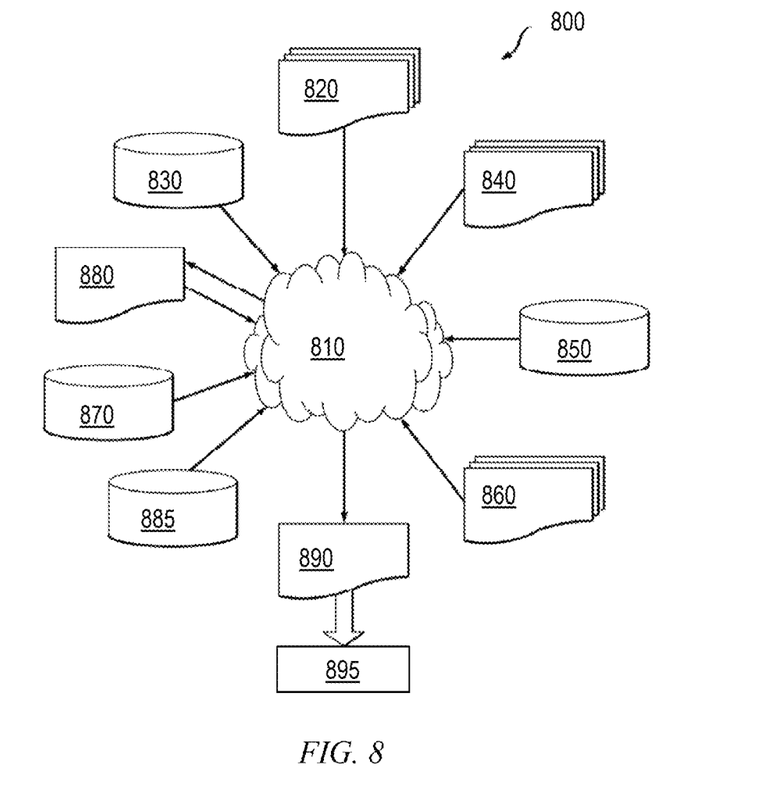
FIG. 8 shows an exemplary high-level Electronic Design Automation (EDA) tool flow, within which aspects of the invention can be employed.

One or more embodiments integrate the timing analysis techniques herein with semiconductor integrated circuit design simulation, test, layout, and/or manufacture. In this regard, FIG. 8 shows a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 800 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a gate array or storage medium or the like, design structure 820 may be accessed and processed by one or more hardware and/or software modules within design process 810 to simulate or otherwise functionally represent an electronic component, circuit, electronic or logic module, apparatus, device, or system. As such, design structure 820 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of components, circuits, devices, or logic structures to generate a Netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 810 may include hardware and software modules for processing a variety of input data structure types including Netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc. Improved placement can be performed as described herein.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 890 may comprise a compiled, executable HDL simulation model that functionally simulates the devices to be analyzed.

Design structure 890 may also employ a data format used for the exchange of layout data of integrated circuits and/or symbolic data format (e.g. information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 890 may then proceed to a stage 895 where, for example, design structure 890: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating an improved VLSI design, comprising:
    performing in-context timing analysis of a nominal VLSI design;
    determining at least one assigned apportionment adjustment for a sub-block of the nominal VLSI design, wherein the at least one apportionment adjustment is determined by dividing a portion of a path delay internal to the sub-block by a sum of the path delay internal to the sub-block and a path delay external to the sub-block;
    deriving one or more slack adjustments for at least one port of the sub-block based on the at least one apportionment adjustment;
    applying the one or more slack adjustments to the in-context timing analysis to simulate a post optimization version of the sub-block; and repeating the in-context timing analysis using the one or more applied slack adjustments to generate the improved VLSI design.

2. The method of claim 1, wherein an apportionment adjustment is determined for each instance of a sub-block design and an apportionment adjustment having a greatest amount of required remediation within the sub-block is used to determine the assigned apportionment adjustment for the sub-block.

3. The method of claim 1, wherein each slack deficit is adjusted by reducing the slack deficit by an amount proportional to the assigned apportionment adjustment for the sub-block.

4. The method of claim 3, wherein an arrival time is determined by reducing a raw arrival time by a difference between an original slack deficit and the assigned delay reduction.

5. The method of claim 1, further comprising removing application of at least one slack adjustment in the in-context timing analysis in response to a completion of an optimization of the corresponding sub-block.

6. The method of claim 1, wherein arrival times, required arrival times, path delays, slacks and adjustments are represented as statistical values.

7. The method of claim 1, wherein one or more sub-blocks labeled frozen are skipped during the applying operation.

8. The method of claim 1, the derivation of the slack adjustment is based on a user-revised version of the apportionment adjustment.

9. The method of claim 1, wherein an arrival time at an output port of a corresponding latch is modified to reflect an intended slack remediation assigned to a specified sub-block.

10. A non-transitory computer readable medium comprising computer executable instructions which when executed by a computer cause the computer to perform the method of:
performing in-context timing analysis of a nominal VLSI design;
determining at least one assigned apportionment adjustment for a sub-block of the nominal VLSI design, wherein the at least one apportionment adjustment is determined by dividing a portion of a path delay internal to the sub-block by a sum of the path delay internal to the sub-block and a path delay external to the sub-block;
deriving one or more slack adjustments for at least one port of the sub-block based on the at least one apportionment adjustment;
applying the one or more slack adjustments to the in-context timing analysis to simulate a post optimization version of the sub-block; and
repeating the in-context timing analysis using the one or more applied slack adjustments to generate the improved VLSI design.

11. An apparatus comprising:
a memory; and
at least one processor, coupled to said memory, and operative to perform operations comprising:
performing in-context timing analysis of a nominal VLSI design;
determining at least one assigned apportionment adjustment for a sub-block of the nominal VLSI design, wherein the at least one apportionment adjustment is determined by dividing a portion of a path delay internal to the sub-block by a sum of the path delay internal to the sub-block and a path delay external to the sub-block;
deriving one or more slack adjustments for at least one port of the sub-block based on the at least one apportionment adjustment;
applying the one or more slack adjustments to the in-context timing analysis to simulate a post optimization version of the sub-block; and
repeating the in-context timing analysis using the one or more applied slack adjustments to generate the improved VLSI design.

12. The apparatus of claim 11, wherein an apportionment adjustment is determined for each instance of a sub-block design and an apportionment adjustment having a greatest amount of required remediation within the sub-block is used to determine the assigned apportionment adjustment for the sub-block.

13. The apparatus of claim 11, wherein each slack deficit is adjusted by reducing the slack deficit by an amount proportional to the assigned apportionment adjustment for the sub-block.

14. The apparatus of claim 13, wherein an arrival time is determined by reducing a raw arrival time by a difference between an original slack deficit and the assigned delay reduction.

15. The apparatus of claim 11, the operations further comprising removing application of at least one slack adjustment in the in-context timing analysis in response to a completion of an optimization of the corresponding sub-block.

16. The apparatus of claim 11, wherein arrival times, required arrival times, path delays, slacks and adjustments are represented as statistical values.

17. The apparatus of claim 11, wherein one or more sub-blocks labeled frozen are skipped during the applying operation.

18. The apparatus of claim 11, wherein an arrival time at an output port of a corresponding latch is modified to reflect an intended slack remediation assigned to a specified sub-block.

\* \* \* \* \*